United States Patent [19]

Yoshimoto et al.

[11] Patent Number: 5,250,932

[45] Date of Patent: * Oct. 5, 1993

[54] LIQUID CRYSTAL DISPLAY DEVICE

[75] Inventors: Hataaki Yoshimoto, Chiba; Katsuhiro Ito, Ichihara, both of Japan

[73] Assignee: Ube Industries, Ltd., Yamaguchi, Japan

[*] Notice: The portion of the term of this patent subsequent to Dec. 3, 2008 has been disclaimed.

[21] Appl. No.: 764,233

[22] Filed: Sep. 23, 1991

Related U.S. Application Data

[63] Continuation of Ser. No. 334,640, Apr. 7, 1989, Pat. No. 5,070,326.

[30] Foreign Application Priority Data

| Apr. 13, 1988 | [JP] | Japan | 63-89224 |
| Jun. 6, 1988 | [JP] | Japan | 63-138870 |
| Jun. 8, 1988 | [JP] | Japan | 63-139438 |

[51] Int. Cl.⁵ .................................................. G09G 3/36
[52] U.S. Cl. .................................. 345/206; 359/54; 359/87; 359/74; 345/88
[58] Field of Search ............... 340/719, 718, 716, 765, 340/784; 359/54, 87, 74, 58

[56] References Cited

U.S. PATENT DOCUMENTS

| 4,233,603 | 11/1980 | Castleberry . |
| 4,403,217 | 9/1983 | Becker et al. . |
| 4,435,047 | 3/1984 | Ferguson . |
| 4,535,327 | 8/1985 | Hareng et al. . |
| 4,632,514 | 12/1986 | Ogawa et al. . |
| 4,693,560 | 9/1987 | Wiley . |

FOREIGN PATENT DOCUMENTS

| 0073705 | 3/1983 | European Pat. Off. . |
| 0152827 | 8/1985 | European Pat. Off. . |
| 2561423 | 9/1985 | France . |
| 56-72421 | 6/1981 | Japan . |
| 83/01016 | 3/1983 | PCT Int'l Appl. . |
| WO86/05282 | 9/1986 | PCT Int'l Appl. . |
| WO88/02129 | 3/1988 | PCT Int'l Appl. . |

OTHER PUBLICATIONS

"A 5×7, Varistor-Controlled LC Matrix Display", Castleberry et al., SID 82 Digest. pp. 246–247.

Patent Abstracts of Japan, Unexamined Applications, P. Field, vol. 11, No. 208, Jul. 7, 1987:Kokai No. 62-28712 (Matsushita Electric).

*Primary Examiner*—Jeffery Brier
*Attorney, Agent, or Firm*—Finnegan, Henderson, Farabow, Garrett & Dunner

[57] ABSTRACT

An LCD device having an improved contrast, able to be operated by a matrix drive, and having a large display area, comprises a pair of transparent first and second bases; picture element electrodes arranged on the first base; signal lines arranged adjacent to the picture element electrode; non-linear elements consisting of varistor particle layers forming bridges between the picture element electrodes and the signal lines; scanning electrodes arranged on the second base; and a liquid crystal material layer located between the picture element electrodes and the scanning electrodes the liquid crystal material being dispersed in a polymeric matrix to form, for example, a NCAP system.

20 Claims, 11 Drawing Sheets

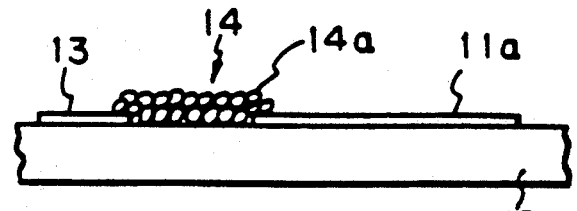
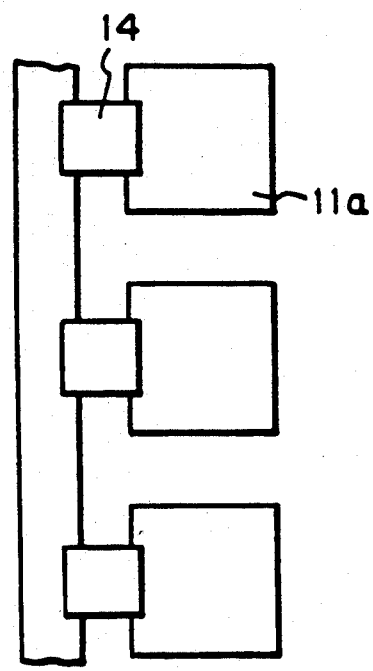
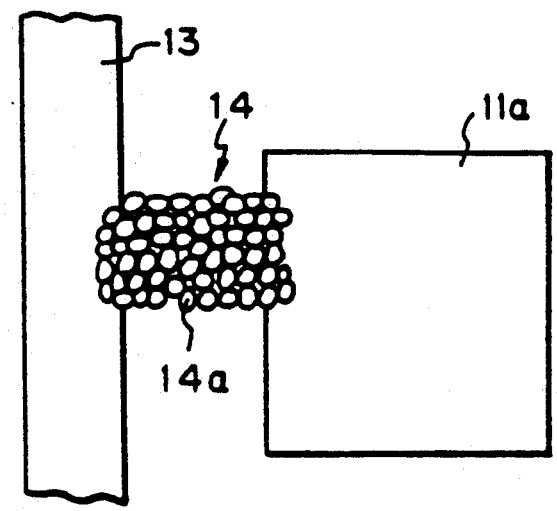
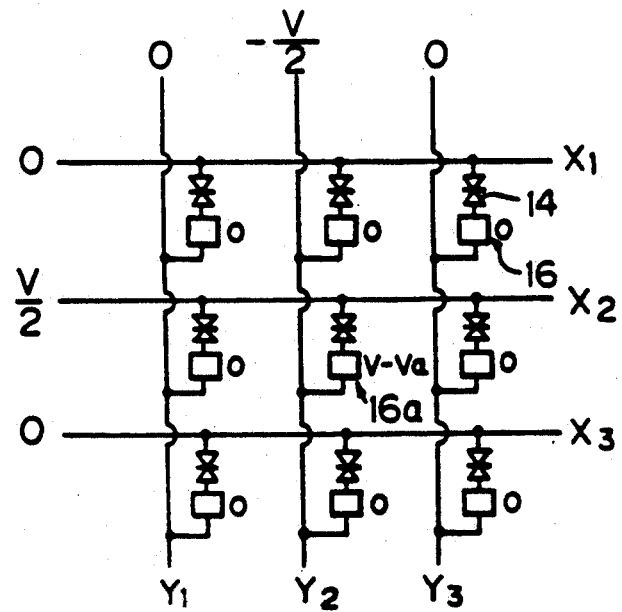

Fig. 10(A)    Fig. 10(B)
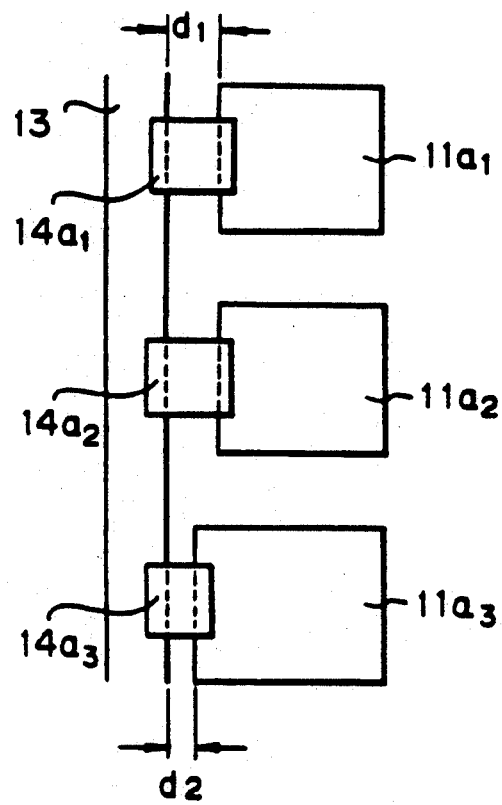
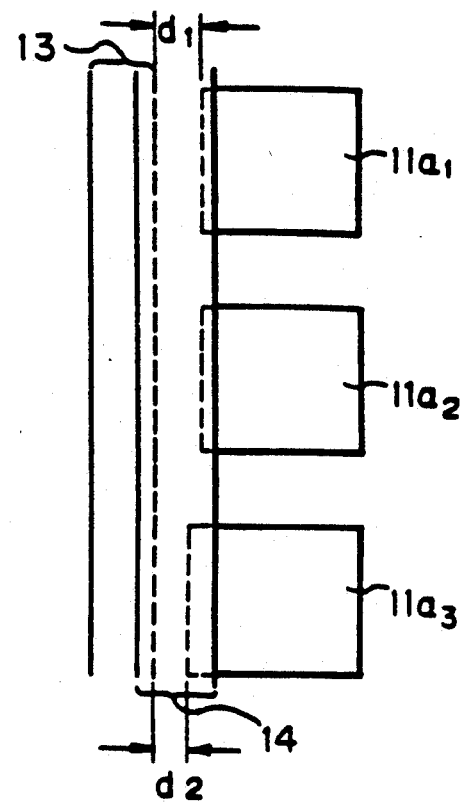
Fig. 11
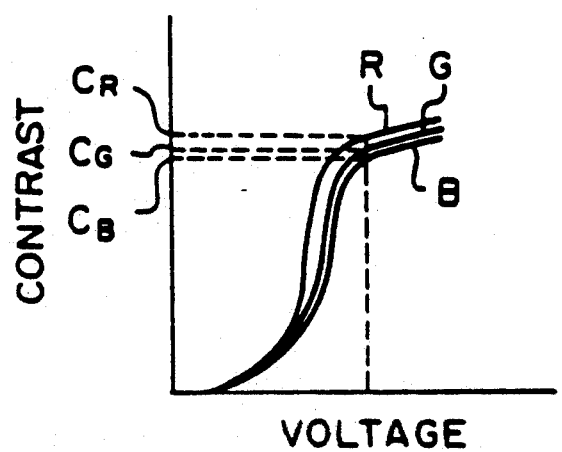

LIQUID CRYSTAL DISPLAY DEVICE

This is a continuation of application Ser. No. 07/334,640, filed Apr. 7, 1989, now U.S. Pat. No. 5,070,326.

BACKGROUND OF THE INVENTION

1) Field of the Invention

The present invention relates to a liquid crystal display device. More particularly, the present invention relates to a liquid crystal display device free from display area restrictions and able to be operated by a matrix drive.

2) Description of the Related Arts

It is known that a liquid crystal display (LCD) device can be operated under a low drive voltage at a low power consumption, and be constructed as a compact and thin device. In particular, a TN type LCD can be operated under a low voltage at a low power consumption, and thus is widely used in various fields, for example, watches and desk-type electronic calculators.

The growing popularity of word processors, personal computers, and other data processing devices has led to a demand for portable, small, and thin devices, and to this end, LCD devices are replacing the CRT (cathode ray tube) device as the display element in those machines. With the LCD device, it is possible to reproduce the image of Chinese characters on the screens of these machines, since a great number of picture elements can be used in the LCD device in comparison with the number of picture elements used in the display device used for watches and desk calculators. Also, the LCD element is operated by a matrix display drive in which picture element electrodes are connected to signal lines in an X-Y matrix form. In this type of LCD device, the picture element electrodes corresponding to the picture elements are not independent from each other, and thus when a predetermined voltage is applied to one picture element electrode, the adjacent picture element electrodes are also operated by this voltage and display an image, i.e., "cross-talk" occurs; "cross-talk" occurs between the one picture element electrode and adjacent picture element electrode.

To eliminate this cross-talk, it s known to use a non-linear element consisting of a diode, for example, metal-insulator-metal diode (MIM) or thin film transistor (TFT) for each picture element electrode, but it is very difficult to provide and arrange a large number, for example, several thousands to several hundreds of thousands, of diodes or thin membrane transistors corresponding to a large number of picture elements, all of which must have uniform properties and be free from defects, and thus there is an urgent need for the development of non-linear elements which can be easily provided with a uniform quality and will allow the use of an LCD device with a large display area. In connection with the above, a new type of liquid crystal material usable for a display in a large display area has been developed through a new technology involving an NCAP (nematic curvilinear aligned phase) type liquid crystal material. With this technology, it is now possible to easily control the thickness of the liquid crystal material layer in the display device, and therefore, the NCAP type liquid crystal material can be formed as a layer having a large surface area, exhibits a very quick response, and allows the resultant display device to be given a wide angle of view without the use of a polarizer plate, and thus can be beneficially utilized to provide an LCD device having a large display surface area.

Nevertheless, the NCAP type liquid crystal material is disadvantageous in that this liquid crystal material requires a drive voltage of several tens to several hundreds of volts higher than that of TN type liquid crystal material, e.g., 5 volts or less, and therefore, a non-linear element having a higher drive voltage than that of conventional non-linear elements must be used for the NCAP type LCD device.

Also, the NCAP type liquid crystal material is disadvantageous in that the voltage-contrast property is not sufficient to produce a really sharp image, and thus when operated by a multiplex drive (simple matrix drive), the resultant display is not absolutely clear.

Further, since the NCAP type liquid crystal material needs a high drive voltage, it is difficult to utilize TFT or MIM having a low drive voltage as a non-linear element, and accordingly, it is considered by persons skilled in the art that NCAP type liquid crystal devices can not be operated by a matrix drive.

SUMMARY OF THE INVENTION

An object of the present invention is to provide an LCD device which contains an NCAP type liquid crystal material layer which is capable of providing a large display surface area and can be operated by a matrix drive.

Another object of the present invention is to provide an LCD device which contains an NCAP type liquid crystal material layer and can display red, green and blue colored lights at a uniform contrast thereof.

Still another object of the present invention is to provide an LCD device which contains an NCAP type liquid crystal material layer and can display red, green, and blue colored lights at a uniform contrast thereof even when the device is operated under a low drive voltage.

The above-mentioned objects can be attained by the LCD device of the present invention, which comprises a first transparent base; a plurality of picture element electrodes arranged on the first base; a plurality of signal lines for supplying electric signals to the picture element electrodes, arranged adjacent to the picture element electrodes on the first base; a plurality of non-linear elements through which the picture element electrodes are connected to the adjacent signal lines; a second transparent base arranged in parallel to and spaced from the first base; plurality of scanning electrodes arranged on a surface of the second base, and facing and spaced from the picture element electrodes; and a liquid crystal material layer located between the picture element electrodes and the scanning electrodes; wherein each non-linear element comprises a varistor, and liquid crystal material is dispersed in a matrix consisting essentially of a polymeric material.

The liquid crystal display device of the present invention may further comprise a plurality of red, green, and blue color filters arranged between the second base and the scanning electrode and in correspondence to the picture element electrodes.

BRIEF DESCRIPTION OF THE DRAWINGS

FIG. 4(A) shows an arrangement of picture element electrodes, signal lines and non-linear elements in the LCD device of the present invention;

FIG. 4(B) shows a front view of a combination of a picture element electrode with a signal line and a non-linear element;

FIG. 4(C) is a plane view of the combination shown in FIG. 4(B);

FIG. 5 shows a matrix circuit of the LCD device of the present invention;

FIGS. 10(A) and 10(B), respectively, show an arrangement of picture element electrodes, non-linear element(s) and a signal line;

FIG. 11 shows voltage-contrast curves for red, green and blue lights of an embodiment of the LCCD (liquid crystal color display) device of the present invention using picture element electrode arrangement such as, for example, 10(A) and 10(B);

DESCRIPTION OF THE PREFERRED EMBODIMENTS

Figure 1:
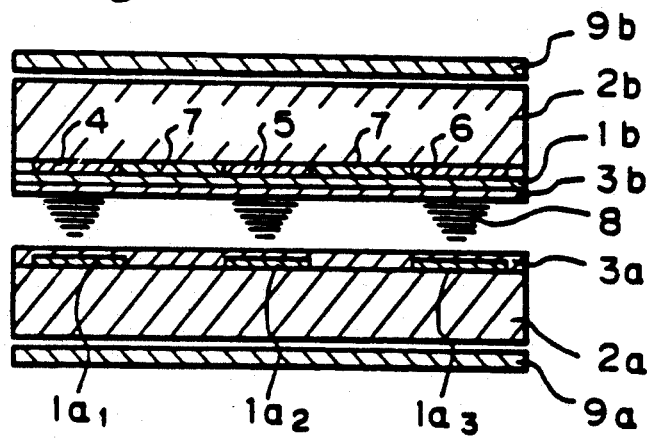
FIG. 1 is an explanatory cross-sectional view of a conventional matrix type TN liquid crystal color display (LCCD) device.

FIG. 1 shows a partial cross section of a conventional matrix type TN LCCD element.

In FIG. 1, a plurality of transparent picture element electrodes $l_{a1}, l_{a2}, l_{a3} \ldots$ are arranged in a predetermined pattern on the upper surface of a first transparent glass base $2a$, and are covered by an orientation membrane $3a$. A plurality of red, green, and blue color filters 4, 5, and 6 and a black mask 7 are arranged in a predetermined pattern on the lower surface of a second transparent glass base $2b$; the color filters 4, 5 and 6 respectively corresponding to the picture element electrodes $l_{a1}, l_{a2}$ and $l_{a3}$.

The color filter 4, 5 and 6 the black mask 7 are covered by a transparent scanning electrode $1b$, which is then covered by an orientation membrane $3b$, and a TN liquid crystal material 8 is filled in the space between the orientation membranes $3a$ and $3b$. Then a polarizer plate $9a$ is arranged on the lower surface side of the first base $2a$ and another polarizer plate $9b$ is arranged on the upper surface side of the second face $2b$.

The TN type liquid crystal display element as shown in FIG. 1 is very sensitive to the thickness of the liquid crystal layer 8, and thus it is difficult to use this device for a large display area. Also, the contrast of the display element is variable depending on the sharpness of the voltage-brightness contrast curve. The sharpness depends on the optical properties of the display element for each of the red, green, and blue colored light, and therefore, sometimes the display device exhibits different contrasts for the red, green and blue color lights.

Figure 2:
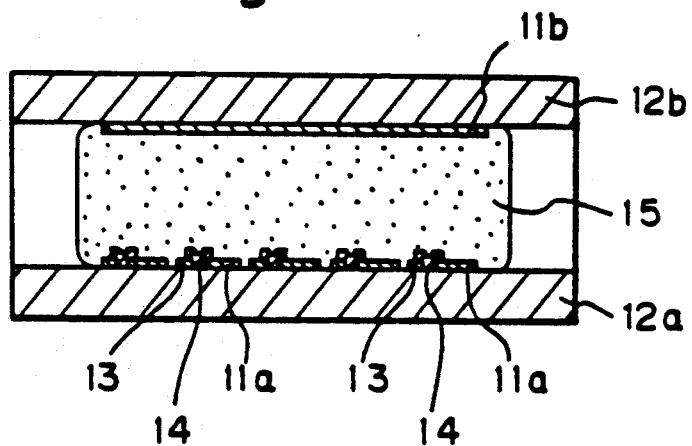
FIG. 2 is an explanatory cross-sectional view of an embodiment of the LCD device of the present invention.

FIG. 2 is an explanatory cross-sectional view of an embodiment of the liquid crystal display device of the present invention.

Referring to FIG. 2, a plurality of picture element electrodes $11a$ are arranged in a predetermined pattern on an upper surface of a first transparent glass base $12a$; a plurality of signal lines 13 for supplying electric signals to the picture element electrodes $11a$ are arranged adjacent to the picture element electrodes $11a$ on the first base $12a$; a plurality of non-linear elements 14 are arranged between and connect the picture element electrodes $11a$ and the adjacent signal lines 13; a second transparent glass base $12b$ is arranged in parallel to and spaced from the first base $12a$; and a transparent scanning electrode $11b$ is fixed to the lower surface of the second base $12b$.

Figure 3:
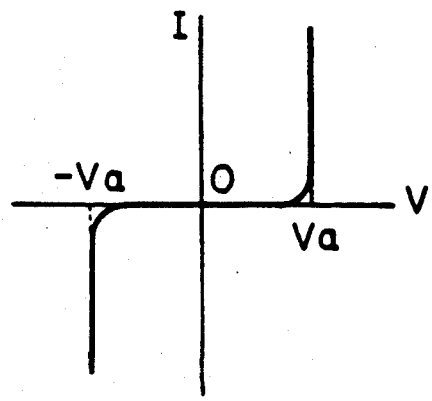
FIG. 3 shows a voltage-current curve of a varistor.

In the LCD device shown in FIG. 2, the space between the first base $12a$ and the second base $12b$ is filled by an NCAP type liquid crystal material 15, and the non-linear elements 14 are varistors. The varistor is usually used as a surge-absorbing element and exhibits a specific voltage-electric current property as shown in FIG. 3. Referring to FIG. 3, the varistor exhibits a high resistance under a voltage having a value less than (Va), and substantially does not allow an electric current to flow therethrough. When the voltage reaches the value (Va), however, the varistor exhibits a significantly reduced resistance and allows the electric current to flow therethrough as shown in FIG. 3. The specific value of the voltage Va is referred to as a threshold value voltage (Vth).

The varistor voltage and capacity can be easily controlled by controlling the distance between electrodes or the size of the varistor particle, and therefore, the varistor is usable in various fields; for example, as a protective material for electronic circuits and against lightning.

In the LCD device of the present invention, the NCAP type liquid crystal material, which can be operated under a relatively high drive voltage, is used in combination with non-linear elements consisting of the varistor which can control the drive voltage at a high level voltage. Therefore, in the present invention, the advantages of the NCAP type liquid crystal material can be effectively utilized, and an LCD device can effectively display various pictorial images consisting of a number of picture elements.

The varistor usable for the present invention is preferably in the form of a layer or film consisting of fine varistor particles. The layer of the fine varistor particles can be easily formed between the picture element electrodes and the adjacent signal lines by printing paste comprising, as a main component, the fine varistor particles. This printing method is advantageous in that the operation for forming the varistor layer is simple and easy, in comparison with conventional varistor layer-forming methods, and a number of non-linear elements having a uniform quality can be provided at a low cost.

When a number of fine varistor particles having a substantially uniform size and a substantially spherical shape are used, the resultant varistor layers between the picture element electrodes and the signal lines exhibit a substantially uniform threshold value voltage (Vth) and the resultant LCD device can produce a satisfactory display.

The varistor particles preferably have a size of 0.1 to 30 $\mu$m, more preferably 2 to 20 $\mu$m. When the varistor particles are excessively large, the resultant varistor non-linear element has an excessively large thickness, and such thick element requires a thick NCAP LC layer, and therefore, an excessively high drive voltage. When the size of the varistor particles is excessively small, the distance between the picture element electrodes and the signal lines must be shortened, and this makes it difficult to form precise gaps between the picture element electrodes and the signal lines.

Referring to FIG. 4A, a plurality of picture element electrodes 11a are separately connected to a signal line 13 through non-linear elements 14.

Referring to FIGS. 4(B) and 4(C), a picture element electrode 11a and a signal line 13 fixed to a first base 12a are connected to each other through a non-linear varistor layer 14 consisting of a number of varistor particles 14a.

Referring to FIG. 5, which shows a matrix circuit of the LCD device of the present invention, a plurality of LCD elements 16 comprising picture element electrodes 11a and corresponding LC material layers (not shown) are connected to signal lines $X_1$, $X_2$, $X_3$ . . . through varistor membranes 14 and to signal lines $Y_1$, $Y_2$, $Y_3$. . . crossing the signal lines $X_1$, $X_2$, $X_3$. . . When voltages 0, V/2 (V/2<Vth<V) and 0 are applied, respectively, to the signal lines $X_1$, $X_2$ and $X_3$, and voltages 0, −V/2 and 0 are applied, respectively, to the signal lines $Y_1$, $Y_2$ and $Y_3$, the LCD element 16a connected to both signal lines $X_2$ and $Y_2$ allows an electric current to flow therethrough but none of the other liquid crystal display elements 16 allows an electric current to flow therethrough, because the varistor layer 14 exhibits a threshold voltage (Vth) which is higher than the voltage V/2 applied thereto; i.e., the varistor layer 14 hinders the flow of electric current therethrough under a voltage of V/2 or less.

In the LCD element 16a connected to the signal lines $X_2$ and $Y_2$, since Va<V, a voltage V−Va is applied to the element 16a, and thus undesirable cross talk between the element 16a and the other elements 16 can be prevented.

The voltage applied to the LCD element 16a connected to the signal lines $X_2$ and $Y_2$ can be maintained at a level lower than the varistor voltage, and thus the LCD element 16a can be maintained in the display state even when the voltages applied to the signal lines $X_2$ and $Y_2$ are varied, because the electric charge is held by the varistor layer.

The varistor layer or film can be produced by the following procedures.

Zinc oxide powder is molded into pellets under a pressure of 50 to 500 kg/cm$^2$ and sintered at a temperature of 700° C. to 1300° C., the sintered pellets are pulverized to provide zinc oxide fine particles having a size of 1 to 80 $\mu$m, and the fine particles are further sintered at a temperature of 800° C. to 1300° C. to make the particles spherical in shape.

The sintered spherical zinc oxide particles are doped with at least one member selected from $Bi_2O_3$, $Co_2O_3$, $MnO_2$, and $Sb_2O_3$ at a temperature of 700° C. to 1300° C., and the resultant varistor particles preferably have a size of 0.1 to 30 $\mu$m, more preferably 2 to 20 $\mu$m. If the size of the varistor particles is excessively large, the resultant non-linear elements have an excessively large thickness, and thus requires an excessively high drive voltage. If the size of the varistor particles is excessively small, the gaps between the picture element electrodes and the signal lines must be made narrower, and it is very difficult to control the formation of such small gaps with a high accuracy.

Preferably, the varistor particles are in spherical form and have an even size, as such varistor particles will form non-linear element having a uniform threshold value voltage, and thus the resultant LCD device will display a clear picture.

The varistor layer bridges the picture element electrode and the signal line but does not completely cover the picture element electrode, and therefore, the LCD device of the present invention having the varistor layer can be used as a light transmission type device.

The resultant varistor particles are mixed with a bonding material consisting of, for example, glass particles and/or an organic binders in an amount of 5 to 200% based on the weight of the varistor, to provide a printable varistor paste.

The organic binder is selected from evaporation-drying type binders and hardening type binders.

The evaporation-drying type binders include cellulosic materials such as methylcellulose, ethye cellulose, cellulose triacetate, polyacrylic resins, for example, poly methyl methacrylate, vinyl acetate polymer and copolymer, and polyvinyl alcohol. The binder may contain a small amount of a solvent or plasticizer.

The hardening binder may be selected from room temperature-hardening binders, for example, epoxy binders (for example, DP-pure 60, made by 3M) and silicone binders (for example, TSE 352, made by Toshiba Silicone); thermal-hardening binders for example, epoxy binders (for example, JA-7434, made by 3M), an silicone binders (for example, Epoxy TSJ 3155), which are heat-hardening type binders; photohardening monomers, for example, 2-ethylhexyl acrylate and dicyclo pentenyl acrylate; photohardening prepolymers, for example, polyesteracrylate, epoxyacrylate, and mixtures of the above-mentioned substances. Preferably, the photo-hardening type binders containing a monomer and/or a prepolymer are used for the present invention, and further, radiation-hardening or electronic ray hardening binders are used for the present invention.

The varistor paste is applied to a first base having a plurality of picture element electrodes and signal lines, to form a bridge therebetween of a film of the paste, and the paste film is solidified, and heat-treated at a temperature of 300° C. to 500° C. if glass particles are used as an adhesive, to form a varistor layer.

The LCD device of the present invention contains the NCAP type liquid crystal material, which NCAP type liquid crystal material is disclosed in PCT International Publication No. W083/01016, U.S. Pat. No. 4,435,047 and "Electronic Material" No. 12, 1987, pages 67 to 70. In the NCAP type liquid crystal material, a liquid crystal material having a positive dielectric anisotropy is surrounded by a transparent surface means or matrix for effecting the natural structure of the liquid crystal material, to induce a distorted alignment thereof in the absence of an electric field and thus reduce optical transmission regardless of the polarization. The liquid crystal material is responsive to the presence of an electric field, to increase the amount of optical transmission.

In the NCAP type liquid crystal material, the above-mentioned surface means or matrix usually contains discrete amounts of the liquid crystal material dispersed therein, for example, in the form of capsules. Usually, the surface means comprises a transparent organic polymeric material having a dielectric constant that is at least equal to the lowest dielectric constant value of the liquid crystal material. The transparent organic polymeric material may comprise a thermoplastic polymeric material for example, a polymester resin, or a thermohardening polymeric material, for example, an epoxy resin.

Figure 6A:
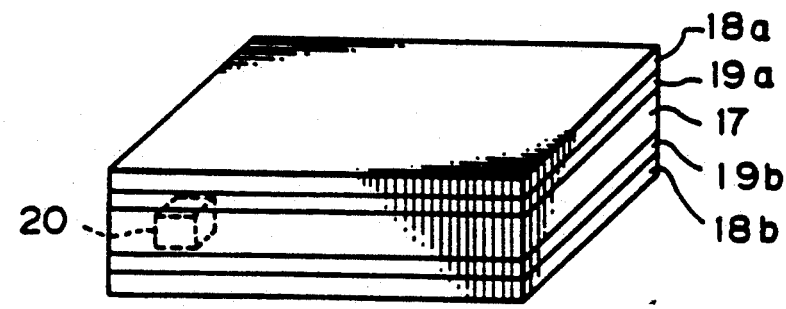
FIG. 6(A) shows an explanatory schematic view of an NCAP type LCD device.
Figure 6B:
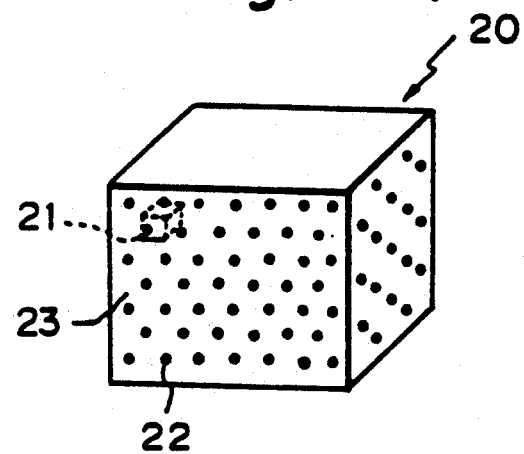
FIG. 6(B) shows an explanatory schematic view of an NCAP type LCD.
Figure 6C:
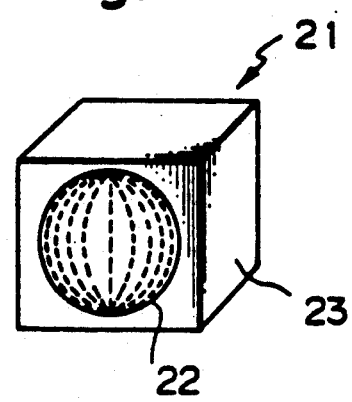
FIG. 6(C) shows an explanatory schematic view of a liquid crystal capsule.

An embodiment of the NCAP type LCD device is shown in FIGS. 6(A), 6(B) and 6(C).

Referring to FIG. 6(A), a NCAP type liquid crystal material layer 17 is arranged between an upper resinous film 18a and a lower resinous film 18b. The resinous films 18a and 18b are coated with transparent electroconductive electrode layers 19a and 19b comprising ITO.

Referring to FIG. 6(B), which shows a portion 20 of the NCAP type liquid crystal layer 17 shown in FIG. 6(A), in the portion 20 of the NCAP type liquid crystal layer 17, a number of fine particles 22 of the liquid crystal material are dispersed in a transparent matrix 23.

Referring to FIG. 6(C), in a small portion 21 of the liquid crystal material layer 17, a spherical particle 22 in a matrix 23 consists of a discrete amount of the liquid crystal material.

Figure 7A:
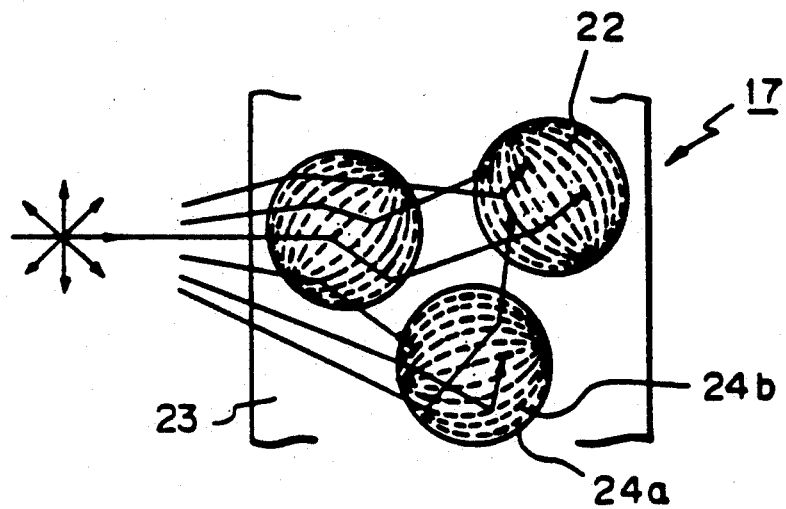
FIG. 7(A) shows a transmission of light applied to a NCAP type LCD in state in which an electric field is not applied.
Figure 7B:
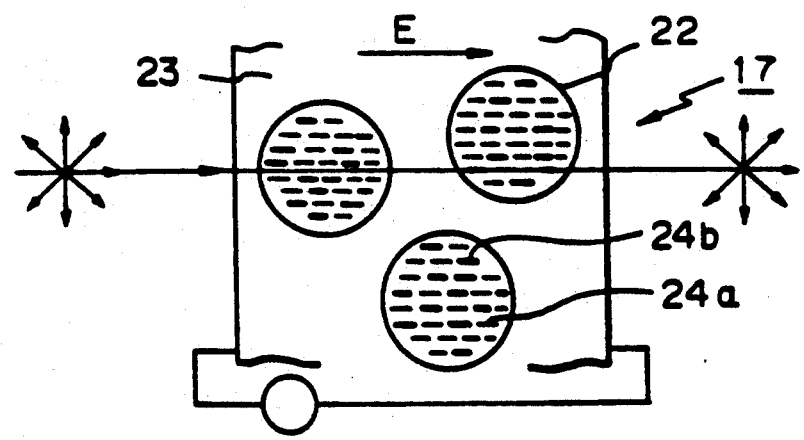
FIG. 7(B) shows a transmission of light through the NCAP type LCD layer in the state in which an electric field is applied.

FIGS. 7(A) and 7(B) show the behaviors of the NCAP type liquid crystal material in the absence and in the presence of an electric field. In the particles, the liquid crystal material contains pleochroic dyes.

In FIG. 7(A), in the absence of an electric field, a number of liquid crystal molecules 24a are aligned along the internal surfaces of the capsules. When a visible light is introduced into the liquid crystal material particle 22 through the transparent matrix 23 in the liquid crystal material layer 17, the incident light is scattered on the outside surface of the particles 22 and in the inside of the particles 22 due to the berefringence of the liquid crystal molecule 24a, and absorbed by the pleochroic dye molecules 24b, and accordingly, the liquid crystal material layer 17 has a dark (black or opaque) appearance.

In FIG. 7(B), when an electric field is applied to the liquid crystal material layer 17, the liquid crystal molecules 24a are aligned in the direction E of the electric field. When the ordinary refractive index of the liquid crystal molecules is almost equal to that of the matrix, the light can pass straight through the liquid crystal material layer 17 without scattering, and thus the liquid crystal material layer 17 has a bright appearance. The degree of transparency of the liquid crystal material layer can be successively varied from a dark (black or opaque) condition to a bright (transparent) condition by varying the intensity of the electric field applied to the liquid crystal material layer.

The varistor layer usable for the present invention can be prepared, for example, by the following method.

Particles of ZnO are sintered at a high temperature of from 700° C. to 1300° C. and milled and screened, sintered ZnO particles preferably having a size of 1 to 30 $\mu$m, more preferably 2 to 20 $\mu$m are collected, and further, preferably, sintered at a temperature of, for example, from 800° C. to 1300° C. to give the particles a spherical shape.

The sintered ZnO particles are usually doped with at least one member selected from, for example, $Bi_2O_3$, $Co_2O_3$, $MnO_2$, and $Sb_2O_3$, preferably in an amount of 0.1 to 10% based on the weight of the ZnO particles, and the resultant ZnO varistor particles are mixed with a bonding material.

The bonding material usually comprises a glass powder having a particle size of 0.1 to 20 $\mu$m, and/or the resinous binder such as, ethyl cellulose, butyl carbitol acetate, polyol acrylates, polyester resins, epoxy acrylates, hexanediol acrylate, and benzoin butyl ether. Usually, the glass powder is used in the amount of 5 to 200% based on the weight of the varistor particles, and the resinous binder is preferably used in an amount of 2 to 100% based on the weight of the varistor particles.

The varistor particle-containing paste is applied in accordance with a predetermined pattern on a base, to form a bridge between the picture element electrodes made from ITO (indium tin oxide) and the corresponding signal lines, by a screen printing method, and the printed varistor paste layers are heat-treated at a temperature of 300° C. to 500° C. to form varistor membranes. Usually, the gaps between the picture element electrodes and the corresponding signal lines are from 10 to 200 $\mu$m, for example, about 50 $\mu$m.

In the LCD device of the present invention, the first transparent base usually comprises a glass plate having a thickness of 0.5 to 2 $\mu$m, and the second transparent base usually comprises a glass plate or a transparent plastic film, for example, polyethylene terephthalate film, having a thickness of 50 to 200 $\mu$m.

The picture element electrodes and the scanning electrode usually comprise ITO (indium tin oxide, and have a thickness of 0.05 to 1 $\mu$m.

The signal lines are usually made from ITD or chromium metal and have a thickness of 0.01 to 1 $\mu$m.

The NCAP type liquid crystal material can be prepared in accordance with the method described in PCT International Publication No. WO 83/01016 and U.S. Pat. No. 4,435,047.

The NCAP type liquid crystal material layer usually has a thickness of 10 to 30 $\mu$m.

In an embodiment of the LCD device of the present invention, a plurality of red, green and blue color filters are arranged between the second base and the scanning electrode in correspondence to the picture element electrodes.

Figure 8:
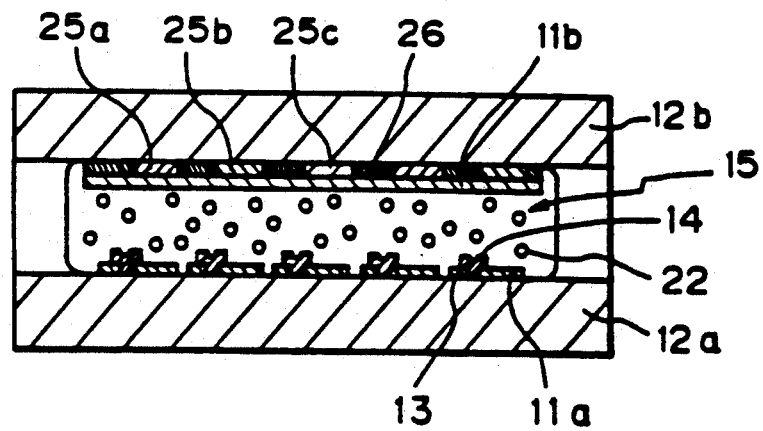
FIG. 8 shows an explanatory cross-sectional view of another embodiment of the LCD device of the present invention.

Referring to FIG. 8, a plurality of red color filters 25a, green color filters 25b, and blue color filters 25c are arranged between the second base 12b and the scanning electrode 11b in correspondence to the picture element electrodes 11a. Also, a plurality of black masks 26 are arranged between the color filters 25a, 25b, and 25c.

Generally, in an LCD device, the constant of color pictorial images depends on the sharpness of the voltage-brightness curve, and the voltage-brightness curve varies in accordance with the type and quality of the color filters, the type and amount of the pleochroic dye, the dependency of light scattering in the liquid crystal material layer, the wave length of the light, and the combination and amount (ratio) of the pleochroic dyes.

Especially, when the pleochroic dyes have absorption peaks in a short wave length band, and the two-tone ratio of the dyes is not good, the voltage-brightness curve is modified.

When a display picture is formed, the red, green, and blue lights are passed through the corresponding red, green, and blue color filters, and any difference in the voltage-brightness property of the LCD elements is the result of differences in the contrast of the colors; e.g., sometimes one color is particularly stressed.

Figure 9:
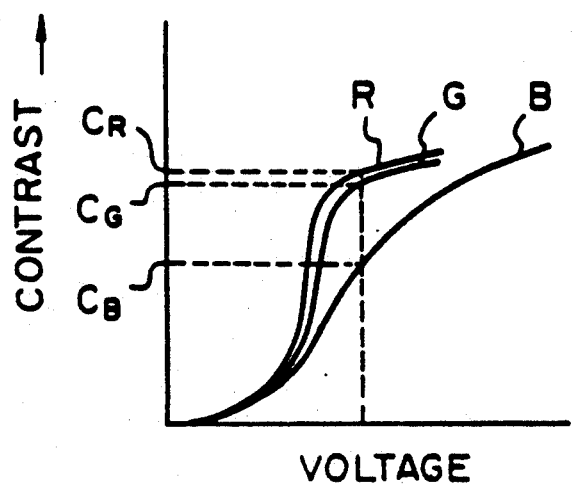
FIG. 9 shows voltage-contrast curves of an NCAP type LCD for red, green, and blue lights.

Referring to FIG. 9, in a NCAP type LCD device, a rising part of a voltage-contrast curve of blue color light transmitted through the blue color filter shows a more gradual inclination than that of the other color filters, and accordingly, it is necessary to eliminate or reduce the difference in contrast between the red, green, and blue color pictures in the LCD device.

In an embodiment of the LCD device of the present invention, the difference in contrast is eliminated or reduced because the varistors connected to the picture element electrodes corresponding to the filters for each of the red, green, and blue colored lights exhibit a different threshold value voltage (Vth) from that for each of the other colored lights, whereby the optical properties of the display device with regard to each of the red, green, and blue colored lights is made substantially identical to those for each of the other colored lights.

Referring to FIG. 10A, in which a plurality of picture element electrodes $11_{a1}$, $11_{a2}$ and $11_{a3}$ are separately connected to a signal line 13 through a plurality of varistor non-linear elements $14_{a1}$, $14_{a2}$ and $14_{a3}$, the picture element electrode $11_{a3}$ has a larger size than that of the other picture element electrodes $11_{a1}$ and $11_{a2}$, and thus the leftmost end line of the electrode $11_{a3}$ is closer to the signal line 13 than that of the other electrode $11_{a1}$ and $11_{a2}$. Namely, the distance $d_2$ between the signal line 13 and the electrode $11_{a3}$ is shorter than the distance $d_1$ between the signal line 13 and the electrode $11_{a1}$ or $11_{a2}$.

Referring to FIG. 10(B), the picture element electrodes $11_{a1}$, $11_{a2}$ and $11_{a3}$ are connected to a signal line #13 through a common varistor 14. The distance $d_2$ between the electrode $11_{a3}$ and the signal line 13 is shorter than the distance $d_1$ between the electrode $11_{a1}$ or $11_{a2}$ and the signal line 13.

And therefore, the threshold value voltage of the varistor $14_{a3}$ is differed from that of the varistors $14_{a1}$ and $14_{a2}$, and thus the voltage-contrast property of the display device for each of the red, green, and blue colored lights becomes identical, as shown in FIG. 11. In FIG. 11, the voltage-contrast curves for the red, green, and blue colored light have a similar shape.

Figure 12:
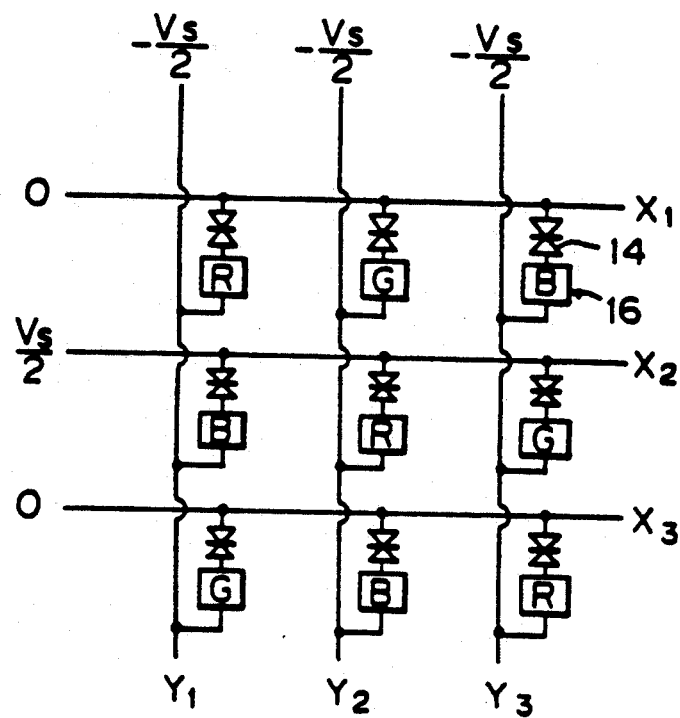
FIG. 12 shows a matrix circuit of an embodiment of the LCCD device of the present invention.

Referring to FIG. 12, an LCD display device has a plurality of signal lines $X_1$, $X_2$, $X_3$ ... and other signal lines $Y_1$, $Y_2$, $Y_3$ ... crossing the signal line $X_1$, $X_2$, $X_3$ ..., a plurality of LCD elements 16 having a picture element electrode 11a and corresponding to red (R), green (G) and blue (B) color filters (not shown in the drawing) connected to the signal lines $X_1$, $X_2$, $X_3$ ... through varistor membranes 14 and directly to the signal lines $Y_1$, $Y_2$, $Y_3$ ...

Figure 13A:
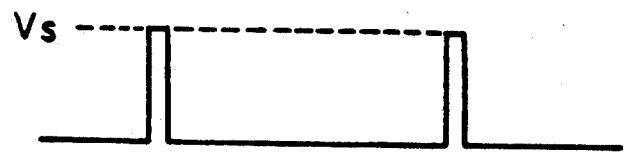
FIG. 13(A) shows a wave form of voltage applied to a signal line of the LCD device of the present invention using, for example, a matrix circuit as shown in FIG. 12.
Figure 13B:
FIG. 13(B) shows a wave form of voltage applied to an LCD element of the device of the present using, for example, a matrix circuit as shown in FIG. 12.

A pulse voltage Vs/2 is applied to the signal line $X_2$, a pulse voltage $-Vs/2$ is applied to the signal lines $Y_1$, $Y_2$ and $Y_3$, and no voltage is applied to the signal lines $X_1$ and $X_3$. Then a pulse voltage having a wave shape shown in FIG. 13(A), is applied between the signal line $X_2$ and signal lines $Y_1$, $Y_2$ and $Y_3$, and as a result, a pulse voltage having a wave shape shown in FIG. 13(B) is applied to each liquid crystal color (R, G, and B) display element 16 and the display elements 16 are brought to the display state.

Figure 14:
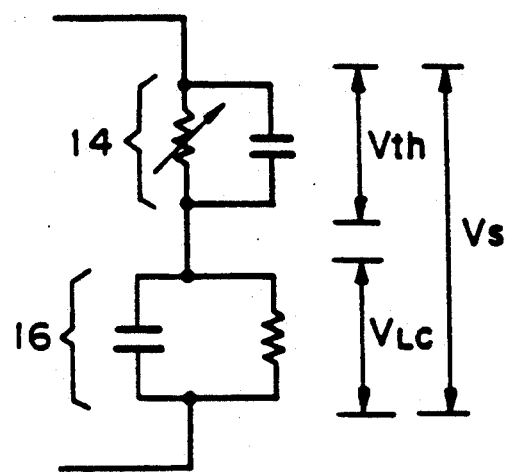
FIG. 14 shows a electric circuit for applying voltages to a picture element electrode and to a varistor layer.

In FIG. 14, a voltage applied between a signal line and each LCD element 16 corresponding to the red, green or blue color filters (not shown in FIG. 14) is represented by $V_{LC}$, and a voltage applied to the varistor layer 14 is represented by Vth (threshold value voltage). The pulse voltage Vs to be applied to each liquid crystal color (R, G, or B) display element 16 is controlled so that it satisfies the relationship:

$$Vs/2 < Vth < Vs$$

When the pulse voltage Vs satisfies the above-mentioned relationship, in the liquid crystal color display element 16 connected to the signal lines $X_1$ and $X_3$, the varistor layers 14 hinder the passage of an electric charge therethrough and into the LCD elements 16, and thus substantially no voltage is applied to the display element 16 and cross talk is prevented.

Referring to FIGS. 10(A), 10(B), and 12, when the distance $d_2$ between a signal line 13 and a picture element electrode $11_{a3}$ corresponding to a blue color filter (not shown in the drawings) is shorter than the distance $d_1$ between the signal line 13 and a picture element electrode $11_{a1}$ corresponding to a red color filter (not shown in the drawings) or a picture element electrode $11_{a2}$ corresponding to a green color filter (not shown in the drawings), the threshold value voltage $Vth_R$, $Vth_G$ and $Vth_B$ of the liquid crystal red, green, and blue colored display elements satisfy the relationship (1):

$$Vth_R \text{ and } Vth_G > Vth_B.$$

In a liquid crystal blue color display element connected to the signal line $X_2$ and to the signal line $Y_1$, $Y_2$ or $Y_3$, the voltage $V_{LCB}$ applied to the blue color display elements is: under the application of a pulse voltage, $$V_{LCB}(P) = Vs - Vth_B$$

and immediately after the application of the pulse voltage is stopped, $$V_{LCB}(O) = Vs - Vth_B.$$

Also, in a red color display element and green color display element connected to the signal line $X_2$ and to the signal lines $Y_1$, $Y_2$ or $Y_3$, the voltages $V_{LCR}(P)$ and $V_{LCG}(P)$ and applied to the red and green color display elements under the application of a pulse voltage are:

$$V_{LCR}(P) = V_s - V_{thR}$$

$$V_{LCG}(P) = V_s - V_{thG}$$

Also, the voltages $V_{LCR}(O)$ and $V_{LCG}(O)$ applied to the red and green color display elements immediately after the pulse voltages are stopped are:

$$V_{LCR}(O) = V_s - V_{thR}$$

$$V_{LCG}(P) = V_s - V_{thG}$$

Accordingly, from the above-mentioned relationships, the relationships between the voltages applied to the red, green, and blue color display elements are:

$$V_{LCR}(P) \text{ and } V_{LCG}(G) < V_{LCB}(P)$$

and $$V_{CLR}(O) \text{ and } V_{LCG}(O) < V_{LCB}(O)$$

Accordingly, the voltage applied to the blue color display element is always higher than the voltages applied to the red and green color display elements, and thus the volume of the light transmitted through the blue color display element can be controlled to a level substantially identical to, that of the light transmitted through the red and green display elements, and exhibits an improved contrast which is substantially identical to that of the red and green display elements.

In another embodiment of the LCCD device of the present invention, the distances between the picture element electrodes corresponding to the red, green, and blue color filters and the scanning electrode are adjusted to different values, to make the optical properties of the display device of each of the red, green, and blue colored lights substantially identical to those of each of the other colored lights.

For example, the distances between the picture element electrodes and the scanning electrode are controlled by providing concavities and/or convexities on at least one of the first and second bases, and forming the picture element electrodes in the concavities and/or on the convexities.

Figure 15A:
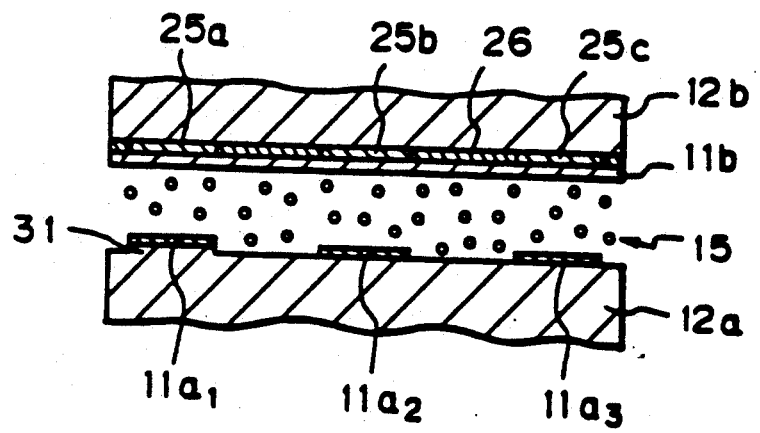
FIGS. 15(A), 15(B), and 15(C), respectively, show explanatory cross-sectional views of another embodiment of the LCCD device of the present invention.

Referring to FIG. 15(A), a convexity 31 is formed on the first base 12a and a picture element electrode $11_{a1}$ corresponding to, for example, a blue color filter 25a, is formed on the convexity 31, with the result that the distance between the scanning electrode 11b and the picture element electrode $11_{a1}$ becomes shorter than that between the scanning electrode 11b and the picture element electrode $11_{a2}$ or $11_{a3}$ corresponding to the green color filter 25b or red color filter 25c.

The convexity 31 can be formed from a transparent insulating material such as glass by a physical vapour deposition (PVD) method, radio frequency (RF) sputtering method or glow discharge method.

Alternatively, concavities are formed on the surface of the first base and picture element electrodes corresponding to, for example, the red and green color filters, are formed in the concavities, with the result that the distances between the scanning electrode and the picture element electrodes become longer than that between the scanning electrode and the other picture element electrodes.

The concavity can be formed on the surface of the first base by a chemical etching method using, for example, hydrofluoric acid, or by a plasma etching method.

The concavities and convexities may be formed on the second base or both the first and second bases.

In another embodiment of the LCCD device of the present invention, the distances between the scanning electrode and the picture element electrodes corresponding to the red, green, and blue color filters are controlled by adjusting the thickness of the picture element electrodes to different values.

Figure 15B:
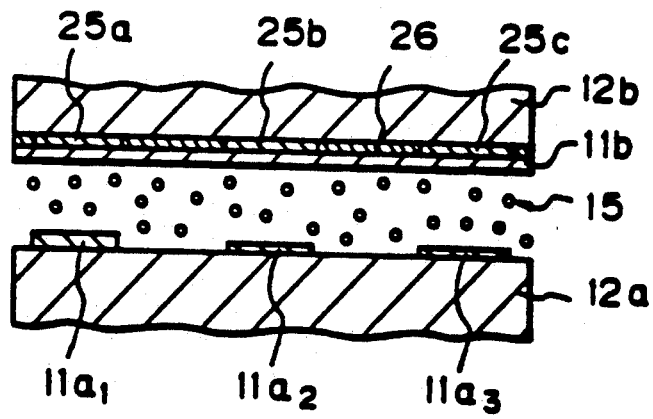

Referring to FIG. 15(B), the thickness of the picture element electrode $11_{a1}$ is larger than that of the other picture element electrodes $11_{a2}$ and $11_{a2}$, and thus the picture element electrode $11_{a1}$ is closer to the scanning electrode 11b than the other picture element electrodes $11_{a2}$ and $11_{a3}$.

In another embodiment of the LCCD device of the present invention, the distances between the scanning electrode and the picture element electrode are controlled by adjusting the thickness of the red, green, and blue color filters to different values, with the result that portions of the scanning electrode corresponding to the red, green and blue color filters are brought closer or made farther from the corresponding picture element electrodes.

Figure 15C:
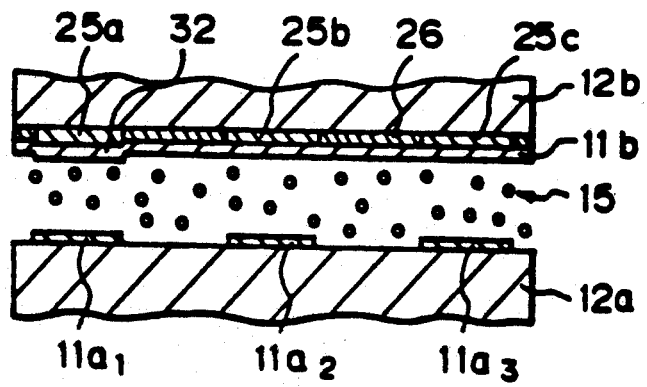

Referring to FIG. 15(C), one color filter, for example, a blue color filter 25a, has a larger thickness than that of the other color filters 25b and 25c, and thus a portion 32 of the scanning electrode 11b is closer to the corresponding picture element electrode $11_{a2}$.

In another embodiment of the LCCD device of the present invention, the sizes of the particles of the liquid crystal material in portions of the NCAP type liquid crystal material layer corresponding to the red, green, and blue color filters are different from each other. The size of the particles of the liquid crystal material can be adjusted to a desired value by controlling the intensity of an agitation during the procedure used for providing an emulsion in which the liquid crystal material is dispersed in the form of fine spherical particles in a matrix consisting of a polyvinyl alcohol aqueous solution.

Figure 16A:
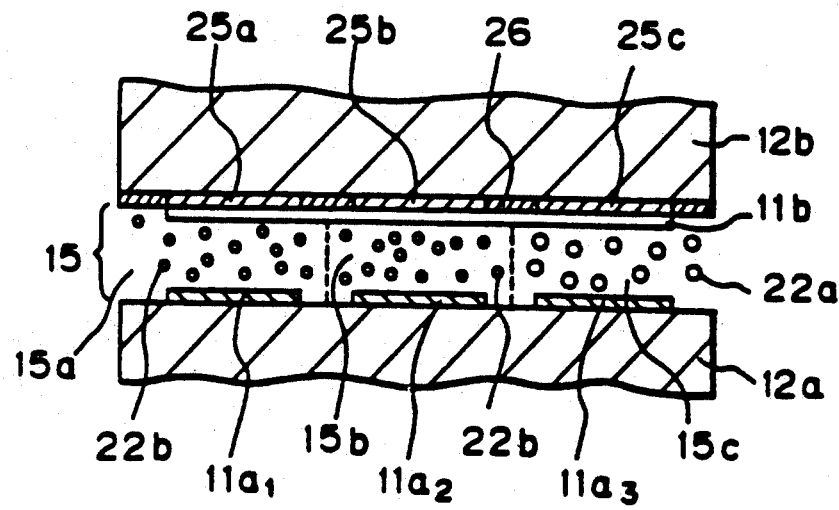
FIG. 16(A) is an explanatory cross-sectional view of another embodiment of the LCCD device of the present invention.
Figure 16B:
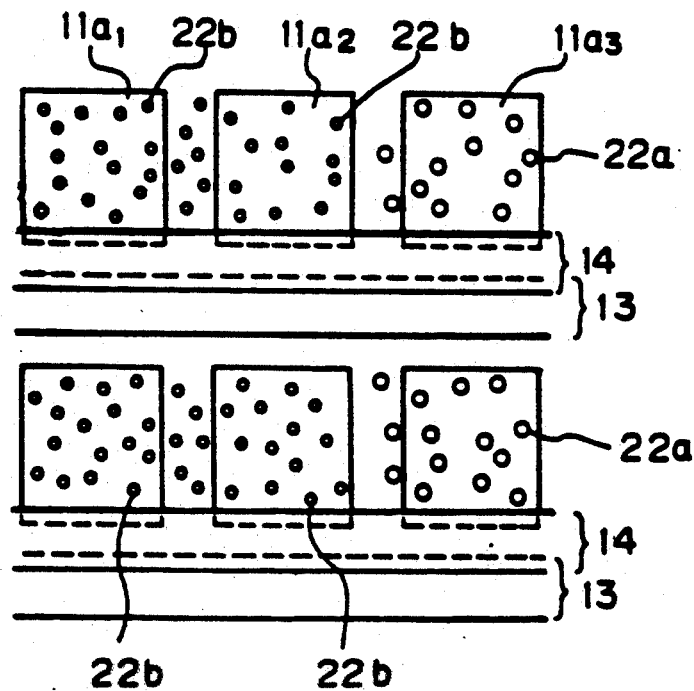
FIG. 16(B) shows an arrangement of picture element electrodes, signal lines and varistor layers in the device shown in FIG. 16(A)

Referring to FIGS. 16(A) and 16(B), a plurality of picture element electrodes $11_{a1}$, $11_{a2}$, and $11_{a3}$ respectively correspond to red, green, and blue color filters 25a, 25b and 25c, and portions 15a, 15b and 15c of the NCAP type liquid crystal material layer 15, respectively, are located between the filter 25a and the electrode $11_{a1}$, the filter 25b and the electrode $11_{a2}$, and the filter 25c and the electrode $11_{a3}$.

The picture element electrodes $11_{a1}$, $11_{a2}$, and $11_{a3}$ are connected to a signal line 13 through a varistor layer 14.

The portion 15c of the liquid crystal material layer 15 corresponding to the blue color filters 25c contains a number of particles 22a of the liquid crystal material surrounded by a transparent polymeric material. The liquid crystal particles 22a corresponding to the blue color light have a larger size than the other particles 22b in the other portions 15a and 15b of the liquid crystal material layer 15, corresponding to the red and green colored lights, and this is advantageous in that the voltage-contrast properties of the LCCD device for the red, green and blue color lights become substantially identical.

The portions 15a, 15b, and 15c of the NCAP type liquid crystal material layer 15 are formed by separately screen-printing three different printing pastes containing the liquid crystal material in the form of particles having a desired size and uniformly dispersed in a polyvinyl alcohol solution, and then solidifying the polymeric material in the printed layers.

As mentioned hereinbefore, a conventional NCAP type LCD device exhibits a poor dependency of contrast on voltage, i.e., it is very difficult to provide an NCAP type LCD device capable of exhibiting a high contrast under a low voltage. An NCAP type LCD device capable of operating under a low voltage exhibits a poor contrast as indicated by curve a in FIG. 17, and another NCAP type LCD device capable of exhibiting a high contrast must be operated under a high drive voltage, as indicated by curve c in FIG. 17. In view of curve c in FIG. 17, a clear matrix display by the conventional NCAP type LCD device can be obtained only under a very high voltage. Namely, even if non-linear elements are used for the LCD elements, and if a contrast of 50:1 is required, the drive voltage, which is a sum of a voltage to be applied to the liquid crystal material layer and a voltage to be applied to the non-linear element, is about twice the voltage (about 80 volts) applied to the liquid crystal material layer (about 160 volts), and accordingly, drive circuits for the NCAP type LCD device must exhibit a high voltage resistance. Also, under the high voltage, the deterioration of the non-linear elements and the liquid crystal material is accelerated.

The above-mentioned disadvantages are eliminated or reduced by providing still another embodiment of the LCD device of the present invention, in which two display devices as described above are reversely superimposed one on the other.

That is, the embodiment of the LCCD device of the present invention comprises: a first transparent base; a plurality of picture element electrodes arranged on the first base; a plurality of signal lines for supplying electric signals to the picture element electrodes, arranged adjacent to the picture element electrodes on the first base; a plurality of non-linear elements through which the picture element electrodes are connected to the adjacent signal lines; a second transparent base arranged in parallel to and spaced from the first base; a plurality of scanning electrodes arranged on a surface of the second base, and facing and spaced from the picture element electrodes; a liquid crystal material layer located between the picture element electrodes and the scanning electrodes; a third transparent base arranged close to and in parallel to the second base; a plurality of additional scanning electrodes arranged on a surface of the third base opposite to the second base; a fourth transparent base arranged in parallel to and spaced from the additional scanning electrodes a plurality of additional picture element electrodes arranged on the fourth base and facing the additional scanning electrodes a plurality of additional signal lines, for supplying electric signals to the additional picture element electrodes, located on the fourth base; a plurality of additional non-linear elements through which the additional picture element electrodes are connected to the additional signal lines; and an additional liquid crystal material layer located between the additional element electrodes and the additional scanning electrodes.

Each of the non-linear elements and the additional non-linear elements is a varistor, and the liquid crystal material in each of the liquid crystal material layer and the additional liquid crystal material layer may be in a nematic curvilinear aligned phase (NCAP).

In a further embodiment of the LCD element of the present invention, the above-mentioned device further comprises a plurality of red, green, and blue color filters interposed between the second and third bases.

Figure 18:
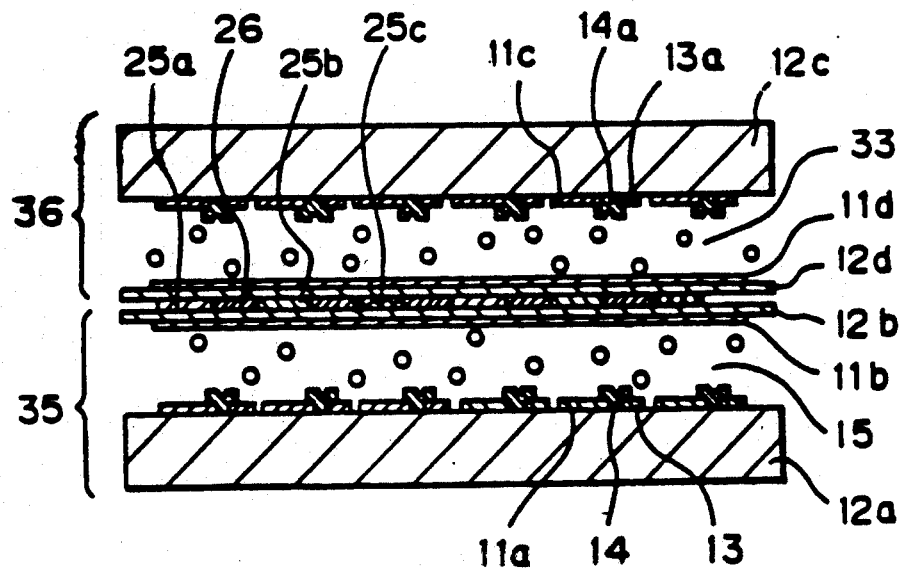
FIG. 18 is an explanatory cross-sectional view of another embodiment of the LCD device of the present invention; and, FIG. 19 shows voltage-contrast curves of an embodiment of the LCCD device of the present invention such as, for example, the device of Example 5.

Referring to FIG. 18, the LCCD device is composed of a lower unit 35, an upper unit 36 and a plurality of red, green, and blue color filters 25a, 25b, and 25c arranged between the lower and upper units 35 and 36.

The lower unit 35 has the same constitution as the LCD device indicated in FIG. 2, but the upper unit 36 has a reverse constitution to the device of FIG. 2. Namely, in the upper unit 36 a third transparent base 12d is arranged close to and in parallel to the second base 12b, so that the red, green and blue color filters are interposed between the second and third bases 12b and 12d; additional scanning electrodes 11d is arranged on the surface of the third base 12d opposite to the surface on which the color filters are arranged; a fourth transparent base 12c is arranged in parallel to and spaced from the additional scanning electrode 11d; a plurality of additional picture element electrodes 11c are arranged on the fourth base 12c and face the additional scanning electrodes 11d; a plurality of additional signal lines 13a for supplying electric signals to the additional picture element electrodes 11c are arranged on the fourth base 12c; a plurality of additional non-linear elements are arranged between and connect the picture element electrodes 11c and the signal lines 13a; and an additional liquid crystal material layer 33 is formed between the additional picture element electrodes 11c and the additional scanning electrode 11d.

Each of the non-linear elements 14 and additional non-linear elements 14a comprises a varistor layer. Also, each liquid crystal material in both of the liquid crystal material layer 15 and the additional liquid crystal material layer 33 may be in an NCAP state.

In the device shown in FIG. 18, when the contrast of display portions to non-display portions in the lower and upper units 35 and 36 is X:1 and Y:1, respectively, under a predetermined voltage applied the picture element electrodes and the scanning electrode, the contrast of the display device consisting of the lower unit 35 and the upper unit 36 is about XY:1. Namely, the combination of the lower unit 35 with the upper unit 36 significantly increases the contrast of the display device.

EXAMPLES

The present invention will be further explained by way of specific examples, which are representative and in no way restrict the scope of the present invention.

EXAMPLE 1

A zinc oxide (ZnO) powder was molded into pellets under a pressure of 400 kg/cm$^2$, the resultant pellets were sintered at a temperature of 1200° C. in an electric furnace, the sintered pellets were pulverized and screened to provide fine zinc oxide particles having a size of from 3 to 8 μm, and the zinc oxide particles were made spherical by a further sintering at a temperature of 1250° C. The resultant spherical zinc oxide particles in an amount of 100 parts by weight were mixed with 1 parts by weight of $Bi_2O_3$, $Co_2O_3$, $MnO_2$, and $Sb_2O_3$ the resultant mixture was sintered at a temperature of 1150°

C., the sintered mixture was screened to provide varistor particles having a size of from 3 to 8 μm, and the varistor particles in an amount of 100 parts by weight were mixed with 30 parts by weight of glass particles having a size of 0.1 μm to 20 μm, 10 parts by weight of a binder consisting of polyvinylacetate resin and 100 parts by weight of butylcarbitol to provide a printable paste.

A plurality of picture element electrodes consisting of ITO and a plurality of signal lines consisting of ITO were formed on a first base consisting of a glass plate, in accordance with a predetermined pattern, and the gaps between the picture element electrodes and the signal lines were about 50 μm. The printed paste was printed on the base by a screen printing method, to form a bridge between the electrodes and the signal lines, and heat treated at a temperature of 450° C. to provide a plurality of varistor layers connecting the electrodes to the signal lines.

Separately, 100 parts by weight of polyvinyl alcohol were dissolved in 900 parts by weight of water, 300 parts by weight of a liquid crystal mixture consisting of mainly cyano biphenyls were mixed with 10 parts by weight of a black dye consisting of azo type pleochroic dyes, and the polyvinyl alcohol solution was mixed with the liquid crystal material to provide an emulsion in which the liquid crystal material was dispersed in a fine spherical particle form in the polyvinyl alcohol solution.

The resultant emulsion was applied to the above-mentioned first glass base with a doctor blade, to form a emulsion layer having a thickness of 10 μm, and separately, scanning electrodes consisting of ITO were formed in accordance with a predetermined pattern on a second glass plate. Then the above-mentioned emulsion was applied to the second base with a doctor blade to form a layer of the emulsion having a thickness of 10 μm.

The first base and the second base were then superimposed one on the other in accordance with a predetermined positioning arrangement, so that the emulsion layers on the first and second bases were incorporated into each other to form an NCAP type liquid crystal material layer, and the edges of the resultant devices were sealed with an adhesive.

The resultant device was operated by connecting a drive circuit to the scanning electrodes and the signal lines under a voltage of ±100 V by a multiplex drive (1/400 duty), and the device exhibited a contrast of 30:1 or more.

The resultant LCD device exhibited a satisfactory contrast.

EXAMPLE 2

The same procedures as those described in Example 1 were carried out except that 100 parts by weight of the ZnO varistor particles were mixed with 15 parts by weight of ethyl cellulose and 115 parts by weight of butylcarbitol acetate to provide a varistor paste, and the second base consisted of a polyethylene terephthalate film.

The resultant LCD device exhibited a satisfactory contrast.

EXAMPLE 3

The same procedures as in Example 1 were carried out with the following exceptions.

The varistor paste was prepared by mixing 150 parts by weight of the ZnO varistor particles, and 35 parts by weight of a photohardening resinous composition consisting of 11.8% by weight of a polyol acrylate, 35.3% by weight of a polyester resin, 23.5% by weight of an epoxyacrylate, 20% by weight of 1,6-hexanediol acrylate, and 5% by weight of benzoinbutylether.

The first and second bases consisted of a polyethylene terephthalate resin.

The paste film applied to the first base was hardened by radiating ultraviolet rays.

The resultant LCD device exhibited a satisfactory contrast.

EXAMPLE 4

The same procedures as those in Example 2 were carried out except that a plurality of red, green, and blue color filters were arranged in the manner shown in FIG. 8.

The resultant LCCD device exhibited a satisfactory contrast.

EXAMPLE 5

The same procedures as those described in Example 4 were carried out, with the following exceptions.

The NCAP type liquid crystal material layer was prepared in the following manner.

A liquid crystal (trademark: E-44, made by BDH Co.) in an amount of 15 parts by weight was mixed with 0.5 parts by weight of a pleochroic dye (trademark: M676, made by Mitsuitoatsu Dye Co.) and 40 parts by weight of a 10% aqueous solution of deionized polyvinyl alcohol (trademark: KM-11, made by Nihon Gosei Kagaku Kogyo), and the mixture was divided into two portions. One portion of the mixture was emulsified by agitating the mixture at a predetermined agitating speed, and the resultant first emulsion contained fine particles of the liquid crystal material having a size of from 1 to 4 μm.

The other portion of the mixture was emulsified at a different agitating speed from that mentioned above, and the resultant particles of the liquid crystal material in the second emulsion had a size of 4 to 10 μm.

The first emulsion was applied to the location corresponding to the red and green color filters on the first and second bases, and the second emulsion was applied to the other location corresponding to the blue color filter on the first base.

The resultant liquid crystal material layer had a thickness of 15 μm, and an LCCD device as shown in FIGS. 16(A) and 16(B) was obtained.

Figure 19:
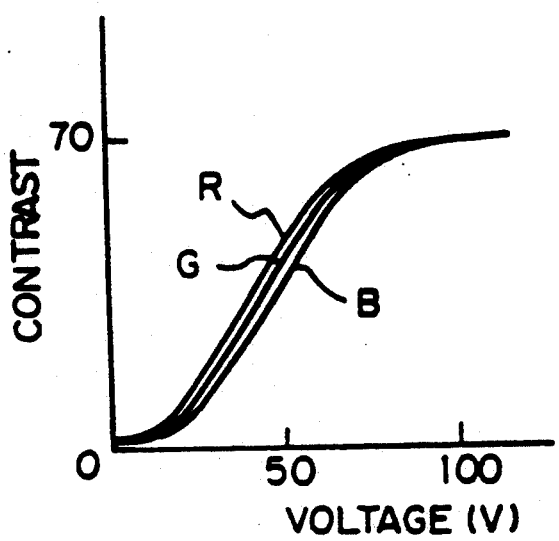

The LCCD device exhibited voltage-contrast curves R, G, and B for the red, green, and blue colored light, as indicated in FIG. 19, and the voltage-contrast curves R, G and B were substantially identical.

EXAMPLE 6

A lower unit of an LCD device was prepared by fixing a transparent electrode layer on a transparent first base consisting of polyethylene terephthalate, coating the electrode layer with an NCAP type liquid crystal material layer having a thickness of 18 μm and prepared from an emulsion of a liquid crystal material consisting of 1 g of a liquid crystal (Trademark: E-44, made by BDH Co.) and 0.03 g of a black dye (trademark: M676, made by Mitsuitoatsu Dye Co.) in 1 g of by weight of polyvinylpyrrolidone and 5 ml of chloroform, and arranging a second polyethylene terephthalate base with a transparent electrode so that the transparent electrode faces that on the first base through the liquid crystal material layer, and the edges of the resultant unit were sealed by an adhesive. This unit exhibited a voltage-contrast property as shown by curve b in FIG. 17.

An upper unit was prepared in the same manner as the lower unit, and reversely superimposed on the lower unit.

Figure 17:
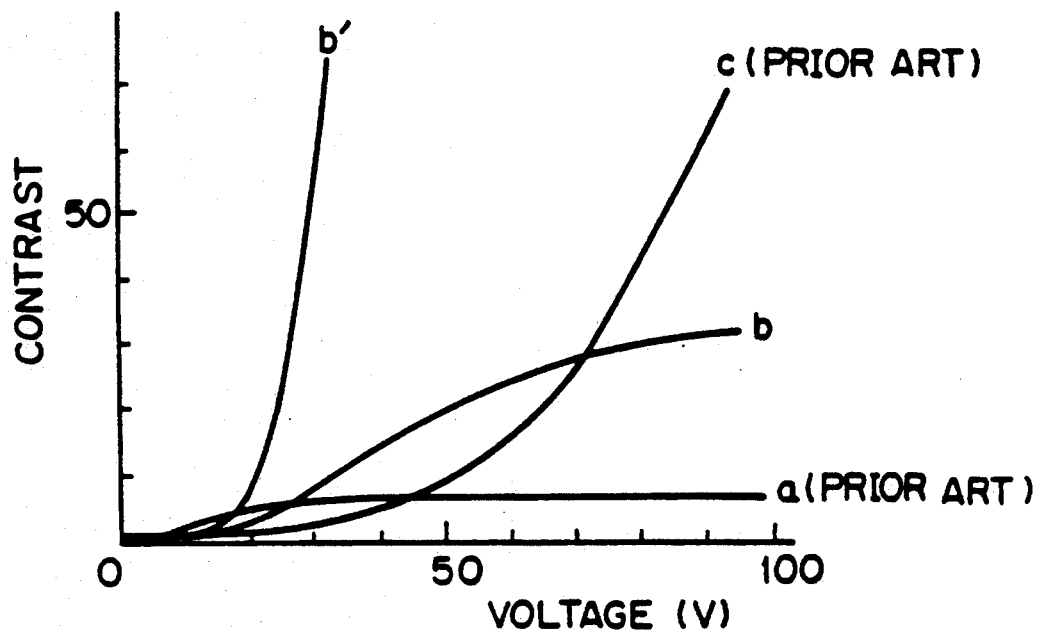
FIG. 17 shows voltage-contrast curves of conventional LCD devices and of the LCD device of the present invention such as, for example, the device of Example 6.

The resultant composite liquid crystal display panel exhibited an improved voltage-contrast property as indicated by curve b' in FIG. 17.

EXAMPLE 7

A composite LCD device having the same constitution as shown in FIG. 18 was prepared in the following manner.

A lower unit was prepared in the same manner as in Example 1, except that the varistor threshold value voltage of each varistor layer was adjusted to 30 volts, and the liquid crystal material layer was prepared in the same manner as in Example 6.

The lower unit exhibited a contrast of 8:1, when operated under an ON voltage of 60 V and an OFF voltage of 30 V by a multiplex drive (32 Hz, 1/200 duty), and no cross-talk occurred.

An upper unit was prepared in the same manner as the lower unit, reversely superimposed on the lower unit, and the edges of the resultant composite panel were sealed with an adhesive.

When the composite panel was operated in the same manner as described above, the contrast was 60:1 and the display was very clear.

We claim:

1. A multiplex drive, liquid crystal display device comprising:
    a first transparent base;
    a plurality of picture element electrodes arranged on the first base;
    a plurality of signal lines arranged on the first base adjacent the plurality of picture element electrodes and supplying electric signals to each one of the plurality of picture element electrodes;
    a second transparent base disposed parallel to and separated from the first base by a predetermined spacing;
    a plurality of scanning electrodes arranged on a surface of the second base such that the plurality of scanning electrodes opposes the picture element electrodes across the predetermined spacing between the first and second bases;
    a layer of liquid crystal material including material of the numeric curvilinear aligned phases type disposed between the plurality of picture element electrodes and the plurality of scanning electrodes and being dispersed in a matrix consisting essentially of a polymeric material; and
    a plurality of varistors connecting the plurality of picture element electrodes to the adjacent plurality of signal lines, each one of said plurality of varistors formed as a layer comprising fine particles having a size of from 0.1 to 30 µm.

2. The device as claimed in claim 1, wherein the varistor layer is formed by printing a paste composed of the fine varistor particles, on the first base.

3. The device as claimed in claim 1, wherein the fine varistor particles consist essentially of ZnO particles.

4. The device as claimed in claim 1, wherein the first base comprises a glass plate.

5. The device as claimed in claim 1, wherein the second base comprises at least one of a glass plate and a polyethylene terephthalate film.

6. The device as claimed in claim 1, wherein the picture element electrodes comprise ITO.

7. The device as claimed in claim 1, wherein the scanning electrode comprising ITO.

8. The device as claimed in claim 1, wherein the liquid crystal material contains a pleochroic dye.

9. The device as claimed in claim 1, wherein the liquid crystal material is in a nematic curvilinear aligned phase (NCAP).

10. The device as claimed in claim 9, wherein the sizes of the particles of the liquid crystal material in portions of the NCAP type liquid crystal material layer corresponding to the red, green and blue color filters are different.

11. The device as claimed in claim 1, further comprising:
    a third transparent base disposed proximate and parallel to the second base;
    a plurality of additional scanning electrodes disposed on a surface of the third base opposite to the second base;
    a fourth transparent base disposed parallel to and separated from the additional scanning electrode by a predetermined spacing;
    a plurality of additional picture element electrodes disposed on the fourth base and opposing the additional scanning electrodes across the predetermined spacing;
    a plurality of additional signal lines for supplying electric signals to the additional picture element electrodes, located on the fourth base;
    a plurality of additional varistors connecting the additional plurality of picture element electrodes to the adjacent additional plurality of signal lines, each one of the additional plurality of varistors formed as a layer comprising fine particles having a size of from 0.1 to 30 µm.; and
    an additional layer of liquid crystal material disposed between the plurality of additional picture element electrodes and the plurality of additional scanning electrodes and dispersed in a matrix consisting essentially of a polymeric material.

12. The device as claimed in claim 11, further comprising a plurality of red, green, and blue color filters interposed between the second and third bases.

13. The device as claimed in claim 11, wherein the additional liquid crystal material is in a nematic curvilinear aligned phase (NCAP).

14. A multiplex drive, liquid crystal display device comprising:
    a first transparent base;
    a plurality of picture element electrodes arranged on the first base;
    a plurality of signal lines arranged on the first base adjacent the plurality of picture element electrodes and supplying electric signals to each one of the plurality of picture element electrodes;
    a second transparent base disposed parallel to and separated from the first base by a predetermined spacing;
    a plurality of scanning electrodes arranged on a surface of the second base such that the plurality of scanning electrodes opposes the picture element electrodes across the predetermined spacing between the first and second bases;

a layer of liquid crystal material including material of the nematic curvilinear aligned phases type disposed between the plurality of picture element electrodes and the plurality of scanning electrodes and being dispersed in a matrix consisting essentially of a polymeric material;

a plurality of varistors connecting the plurality of picture element electrodes to the adjacent plurality of signal lines, each one of said plurality of varistors formed as a layer comprising fine particles having a size of from 0.1 to 30 μm; and a plurality of red, green and blue color filters disposed between the second base and the plurality of scanning electrode in locations corresponding to the picture element electrodes.

15. The device as claimed in claim 14, wherein each respective varistor connecting a respective picture element electrode proximate a respective one of the red, green and blue colored filters exhibits a different threshold value voltage (Vth) from that of other varistors connecting picture element electrodes proximate the other red, green, and blue color filters, such that optical properties of the display device for each of red, green and blue color lights are made substantially identical to those for the other color lights.

16. The device as claimed in claim 15, wherein a distance between an adjacent one of the plurality of signal lines and the picture element electrodes corresponding to a respective one of the red, green and blue color filters is different from another distance for any of the other color filters.

17. The device as claimed in claim 14, wherein distances at points between the plurality of scanning electrodes and the plurality of picture element electrodes corresponding to the red, green and blue color filters are adjusted to different values to make the optical properties of the display devices for each of the red, green and blue colored lights substantially identical to those for the other colored lights.

18. The device as claimed in claim 17, wherein the distances at points between the plurality of picture element electrodes and the plurality of scanning electrodes are controlled by providing at least one of concavities and convexities on at lest one of the first and second bases, such that respective ones of the plurality of picture element electrodes are formed at one of the at least one of concavities and convexities.

19. The device as claimed in claim 17, wherein the distances between the picture element electrodes and the scanning electrode are controlled by adjusting the thicknesses of the picture element electrodes to different values.

20. The device as claimed in claim 17, wherein the distances between the picture element electrodes and the scanning electrodes are controlled by adjusting the thicknesses of the color filters to different values so that portions of the scanning electrodes corresponding to the color filers are brought closer to and farther from the corresponding picture element electrodes.

* * * * *

UNITED STATES PATENT AND TRADEMARK OFFICE
CERTIFICATE OF CORRECTION

PATENT NO. : 5,250,932
DATED : October 5, 1993
INVENTOR(S) : Yoshimoto et al.

It is certified that error appears in the above-identified patent and that said Letters Patent is hereby corrected as shown below:

Claim 1, column 17, line 52 change "numeric" to --nematic--.

Claim 18, column 20, line 15 change "lest" to --least--.

Signed and Sealed this

Twenty-second Day of February, 1994

Attest:

BRUCE LEHMAN

Attesting Officer    Commissioner of Patents and Trademarks